Figure 1:
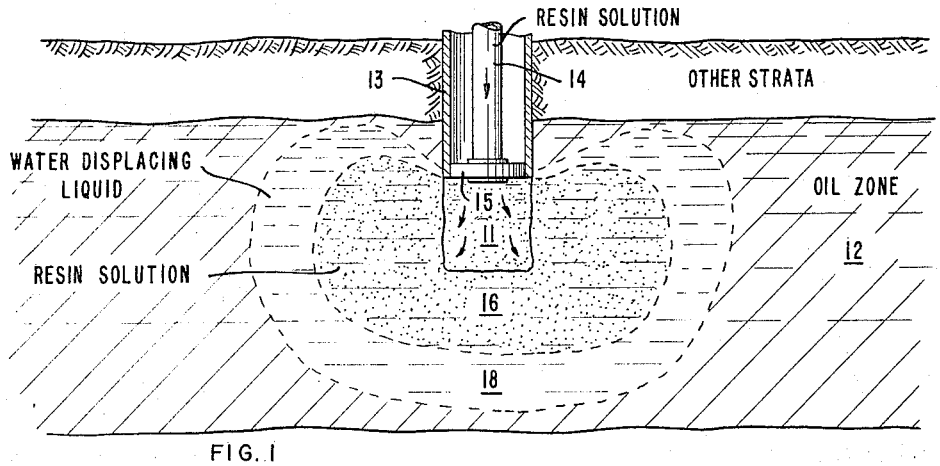

Dec. 27, 1966    F. H. MEIJS ETAL    3,294,165
METHOD FOR TREATING PERMEABLE EARTH FORMATIONS
Filed Aug. 5, 1963

INVENTORS:
CORNELIS BEZEMER
FRANCISCUS H. MEIJS
MARINUS VAN ZANTEN

BY:

THEIR ATTORNEY

United States Patent Office

3,294,165
Patented Dec. 27, 1966

3,294,165
METHOD FOR TREATING PERMEABLE EARTH FORMATIONS
Franciscus H. Meijs, Cornelis Bezemer, and Marinus van Zanten, Rijswijk, Netherlands, assignors to Shell Oil Company, New York, N.Y., a corporation of Delaware
Filed Aug. 5, 1963, Ser. No. 299,897
Claims priority, application Great Britain, Aug. 8, 1962, 30,432/62
17 Claims. (Cl. 166—33)

This invention relates to a method for treating a permeable earth mass, which is located either above or below the surface of the earth. More particularly it relates to methods of consolidating unconsolidated or substantially unconsolidated masses such as loose sand, particularly surrounding oil wells, while retaining, if desired a substantial degree of permeability to oil therein. According to this invention, use is made of an epoxy compound which on hardening—either at the ambient temperature of the mass or at a higher temperature—either fills the pore space of the permeable mass, or forms a film covering the walls of the pore space of said mass.

The method according to the invention wherein the hardened epoxy compound fills the pore space of a permeable mass may be applied for plugging purposes in case the mass is to be tight against the passage of fluids which is often required in dams or dikes, in holes dug in the ground, or to close the communication between a subsurface formation containing oil, water or gas and the interior of a well or mine-shaft penetrating in such formation. Further filling of the pore space is often desirable for foundation purposes, wherein the strength of a mass—either consolidated or unconsolidated—has to be improved. In particular the treatment can be carried out to strengthen the subsurface soil below buildings, or at the lower ends of piles.

The method according to the invention wherein the hardened epoxy compound forms a film covering the walls of the pore space of a permeable mass, can be used to advantage for improving the strength of an unconsolidated or substantially unconsolidated mass, e.g., for foundation purposes.

As the original permeability of a mass treated by the method wherein the hardened epoxy compound forms a film on the wall of the pore space, is substantially retained, this method is particularly suitable to provide a bond between the loose grains of a subsurface formation which is penetrated by a well, to prevent the grains from being entrained by fluid passing into or out of the formation. In particular when such a well is used as a production well for producing gas, water or oil from a subsurface formation, considerable damage can be done to the production equipment by those grains which are carried upwardly by the fluid flow to the well head. The coarser grains, which are not carried upwardly by the fluid flow to the well head, accumulate in the producing section of the well and thus reduce the well's production rate. If the production rate becomes too low, the well has to be cleaned out before a new production cycle can begin. In some cases the grains enter the well in such great quantities that it is not possible to produce the well economically.

One of the requirements of a good consolidation method is that it can be applied at the various temperatures which are to be expected in the formations. Further, it is required that the bond formed by the hardened resin between the particles or grains of the formation will be resistant to formation fluids and/or to chemicals injected into the formation, as well as to movements in the neighboring unconsolidated parts of the formation. On the other hand, the amount of resin required to give the formation the necessary mechanical strength should not excessively impair the permeability thereof so that a flow of fluids from the formation to the well, or vice versa, will remain possible. This is of utmost importance when consolidating formations having a low permeability.

This invention meets the requirement for a good sand consolidation method as stated, and provides an improved method of sand consolidation compared with known methods of sand consolidation by means of various plastics, including epoxy resins.

The objects of this invention include the following:
To provide an improved method for treating a porous earth formation by causing the grains thereof to be coated with a thin layer of an amine-cured epoxy resin;
To provide an improved method for treating a water wetted porous earth formation with a solution which deposits a resin on the grains of said formation;
To provide an improved method for treating an earth formation surrounding a borehole with a solution of a resin which separates from said solution and coats the grains of said formation, and which is capable of being adjusted to accommodate wide variation in the temperature, permeability, depth of the formation, and tubing arrangements in said borehole;
To provide an improved method for consolidating unconsolidated or substantially unconsolidated earth formations;
To provide a sand consolidation treatment which consolidates an unconsolidated earth formation by means of a resinous cementing material which is substantially unaffected by the chemical properties of the mineral components of the sand and which in its cured condition is not substantially attacked by fluids passing through said formations;
To provide a method which permits substantial prolonging of the producing life of oil wells producing through an unconsolidated formation;
To provide an improved solution of an epoxy resin and an amine curing agent for injecting into a formation surrounding a borehole.

Figure 2:
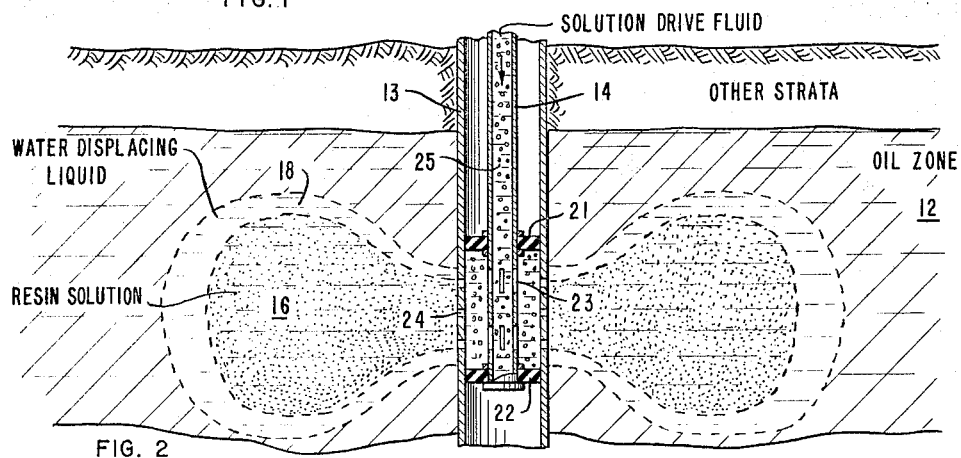
Figure 3:
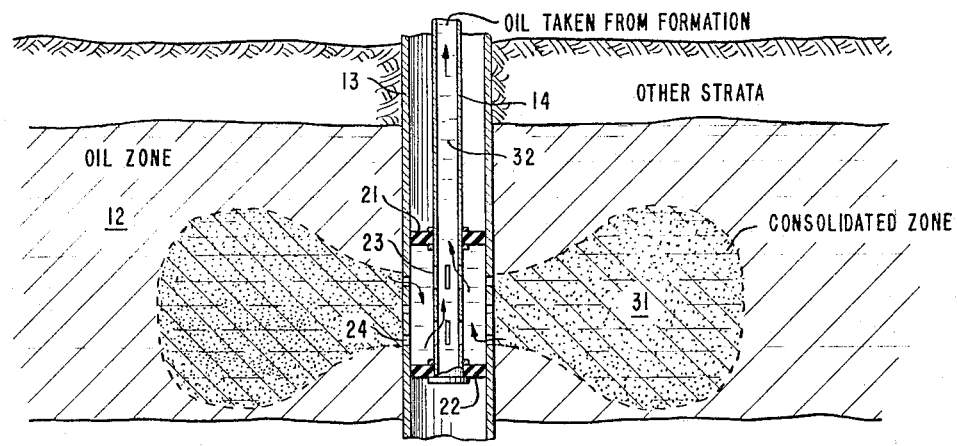

These and other objects of this invention will be understood from the following description, taken with reference to the attached drawing wherein:
FIG. 1 is a vertical section through a well borehole diagrammatically illustrating the injection of a resin solution into a formation;
FIG. 2 is a vertical section through a well borehole illustrating an alternative method of injection of a resin solution into a formation; and
FIG. 3 is a vertical section through the same well borehole illustrated in FIG. 2, and illustrates the production of oil from the treated formation.

The method for treating a permeable mass according to the present invention comprises the steps of (a) preparing a solution of an epoxy resin having more than one vicinal epoxy group per molecule and an amine capable of acting as curing agent for said epoxy resin, in an alcoholic solvent which also has preferential solubility for the intermediate resin product so as to keep dissolved the amount of intermediate resin product formed during the time required to pump said solution into an earth formation to be treated, (b) injecting the solution into the pore space of the permeable mass to be treated, and (c) retaining the solution in the mass for a sufficient time to permit an intermediate resinous product to separate from the solution, deposit on the particles of the mass and cure to a hard, cross-linked resin.

Preferably the total amount of epoxy compound and curing agent is chosen between 3 and 50 vol. percent of the solution, and the solution is adjusted to retain a viscosity below 100 centipoises at formation conditions.

This invention is especially useful in the consolidation of unconsolidated sand formations surrounding the boreholes of oil wells. The remainder of the description therefore will be largely directed to sand consolidation.

The porosity and permeability of the formation to be treated permit estimation of the amount of surface area that should be contacted by the cured resin. The concentration of the resin components (the epoxy compound, curing agent) per total solvent is selected to form a solution containing from 3 to 50, preferably from about 5 to about 20 percent by volume of resin components, sufficient to contact substantially all of the surface area in the portion of formation to be impregnated by the solution.

The time which is required to inject solutions into the formation, the formation temperature, and the shut-in period which is desirable after the treatment are indicative of the rate at which the resin should react; the resin components are selected to react at a suitable rate and preferably to provide an excess of the amine curing agent, which imparts the property of preferentially wetting the surfaces of earth formation materials to the partially cured resin.

One of the advantages of this invention over the use of phenolic resins and over some previously described methods of utilizing epoxy resins for the consolidation of earth formations is that all reactants required to produce the resinous cement are present in a single batch of liquid. While, as will be described hereinafter, it may be desirable to pretreat the formation to be consolidated with a water-displacing liquid, if desired preceded by an oil-displacing liquid and followed by a spacer liquid, these do not exert any significant chemical action on the earth formation, serving merely to remove any unbound water from the formation. Whether or not the use of any of the displacing liquids is advantageous depends on the characteristics of the formation being treated. A spacer liquid is not needed when the water displacing liquid is compatible with the resin solution.

A particular desirable aspect of this invention is that an amine is employed which not only serves as curing agent but also has the property of imparting surfactant characteristics to the partially cured resin which precipitates from solution, causing said resin to preferentially adhere to grains of the formation. The amine is preferably employed in at least 5% molar excess over the amount stoichiometrically required to react with all the epoxy groups of the uncured epoxy resin. By preparing the resin-amine solution in this manner the bond between precipitated resin and the sand grains of originally water-wet earth formation is greatly improved.

If precipitated resin were present in the solution when it reaches the formation it would tend to cause undesired effects, e.g., fracturing of the formation. It is, therefore, an important aspect of the process of this invention that the resin solution is prepared in a controlled manner to prevent any precipitation of solid resin prior to the time it is completely injected into the formation to be treated. This is accomplished by selecting the type and concentration of solvent, resin, curing agent and cure rate modifier in a manner described hereinafter in greater detail, and by preventing contact of the resin solution, prior to injection into the formation, with materials which would precipitate resin therefrom.

A significant distinctive characteristic of this invention is the property of the treating solution of this invention that it retains partially cured epoxide amine resin product in solution until the treating composition is placed in the formation, and thereafter permits partially cured product to separate as a viscous, insoluble liquid phase which preferentially wets sand grains. Solutions of other resins and solutions of epoxy resins with other curing agents tend to form gels at such a stage of partial curing. Such gels do not selectively wet the grains of the formation and hence are not able to result in a treated formation which still retains the major proportion of its original permeability to oil. Also, formations treated according to this invention, in which resin cementing takes place at the contact points of the individual grains of the formation, are stronger than similar formations treated by other methods.

COMPONENTS USED IN THE TREATING PROCESS

Solvents

As alcoholic solvent there are preferably used alkanols of 1 to 4 carbon atoms per molecule, i.e., methanol, ethanol, isopropanol, n-propanol, n-butanol, isobutanol, sec. butanol, tert. butanol or suitable mixtures thereof.

Polyepoxides

The polyepoxides used in the process of the invention comprise those organic materials possessing more than one vic-epoxy group, i.e., more than one

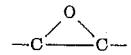

group. These materials may be saturated or unsaturated, aliphatic, cycloaliphatic, aromatic or heterocyclic.

The polyepoxides can be described in terms of epoxy equivalent value, which refers to the number of epoxy groups contained in the average molecule. The meaning of this expression is described in U.S. 2,633,458.

If the polyepoxide consists of a single compound and all of the epoxy groups are intact, the epoxy equivalency will be integers, such as 2, 3, 4 and the like. However, in the case of polymeric type polyepoxides many of the materials may contain some of the monomeric monoepoxides or have some of their epoxy groups hydrated or otherwise reacted and/or contained macromolecules of somewhat different molecular weight so that epoxy equivalent values may be quite low and contain fractional values. The polymeric material, may, for example, have epoxy equivalent values, such as 1.4, 1.8, 2.5 and the like.

Polyepoxides suitable for conversion to cured epoxy resins are well-known materials of commerce. Many are described in the book "Epoxy Resins" by Lee and Neville, McGraw-Hill, New York, 1957.

Examples of such polyepoxides are the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenyl)butane, 4,4'-dihydroxybenzophenone, bis(4-hydroxyphenyl)ethane, 2,2-bis(4-hydroxyphenyl)pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

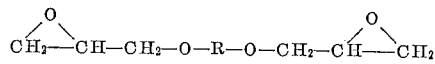

wherein R represents a divalent hydrocarbon radical of the dihydric phenol. The polymeric products will generally not be a single simple molecule but will be a complex mixture of glycidyl polyethers of the general formula

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The aforedescribed preferred glycidyl polyethers of the dihydric phenols are prepared in known manner by reacting the required proportions of the dihydric phenol and the epichlorohydrin in an alkaline medium.

Preferred members of the above-described group of polyepoxides are the glycidyl polyethers of the dihydric phenols, and especially of 2,2-bis(4-hydroxyphenyl)propane, having an epoxy equivalency between 1.0 and 2.1, preferably at least 1.4, a molecular weight between 250 and 900, and a Durran's Mercury Method softening point preferably no greater than 30° C. Most preferred are the normally liquid products having a molecular weight of about 350 to 400 and an epoxy equivalent of about 1.75 to 2.1, which may be prepared as described under the heading "Polyether A" in U.S. 2,633,458.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Another group of polyepoxides that may be used comprises the glycidyl ethers of novolak resins, which resins are obtained by condensing an aldehyde with a polyhydric phenol. A typical member of this class is the epoxy resins from formaldehyde 2,2-bis(4-hydroxyphenyl)propane novolak resin.

Amine curing agents

The curing agents to be used to combine with the above-described polyepoxides in the process of the present invention are amines which act both to impart preferential sand grain-wetting properties to the partially cured resin products, and as curing agent to convert the polyepoxide to an insoluble infusible form.

Especially preferred for use in this invention are the polyamines possessing one or more 6-membered carbocyclic ring, i.e., cycloaliphatic or aromatic rings. These include 1-cyclohexylamino-3-aminopropane, 1,4-diaminocyclohexane, 1,3-diaminocyclopentane, bis(3-methyl-4-aminocyclohexyl)methane, bis(4 - aminocyclohexyl)methane, di(aminocyclohexyl)sulfone, 1,3-di(aminocyclohexyl)propane, 4 - isopropyl-1,2 - diaminocyclohexane, 2,4-diaminocyclohexane, N,N'-diethyl-1,4 - diaminocyclohexane, and the like. Preferred members of this group comprise those polyamines having at least one amino or alkyl-substituted amino group attached directly to a cycloaliphatic ring containing from 5 to 7 carbon atoms. Especially suitable are hydrogenated primary and secondary aromatic polyamines having at least two amino hydrogens, at least 50% of their aromatic structure having been converted to cycloaliphatic structure during hydrogenation. These cycloaliphatic amines are preferably obtained by hydrogenating the corresponding aromatic amine. Thus di(aminocyclohexyl)methane is obtained by hydrogenating methylene dianiline. Use of these amines is described in further detail in U.S. 2,817,644 to Shokal et al., the pertinent disclosures of which are incorporated herein by reference. These amines are especially preferred because they react comparatively slowly with the preferred epoxides in alcoholic solution. Notwithsanding this, in many cases they do not provide ample time for the solution to be pumped into the earth formation to be treated, especially in deep wells and those most resistant to injection of fluid. As explained hereafter, in more detail, the time of first precipitation of resin from solution of such amines with polyepoxides can be lengthened to a desired extent by addition of cure retardants.

Suitable for use particularly at relatively high temperatures are the aromatic polyamines, such as 1,3-diaminobenzene, 1,4-diamonobenzene, 4,4'-diaminodiphenyl, 1-phenylamino-3-aminopropane, di(2 - aminophenyl)methane, bis(4-aminophenyl)methane, bis(3-methyl-4-aminophenyl)methane and bis(4-aminophenyl)sulfone.

Other, generally less preferred amines include, among others, the aliphatic polyamines, such as, for example, propylene diamine, hexylene diamine, diethylene triamine, triethylene tetramine, tetraethylene pentamine, 1,3-diaminobutane and hexamethylene diamine.

Other suitable, though less preferred amines are the N-(aminoalkyl)piperazines, such as, for example, N-aminobutylpiperazine, N - aminoisopropyl - 3-butoxypiperazone, N-aminoethylpiperazine, 2,5 - dibutyl-N-aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains 2 to 6 carbon atoms, and the total molecule contains no more than 18 carbon atoms.

Cure rate modifiers

Among the numerous amines illustrated above as being suitable for use in the process of this invention, compounds can be found which will result under suitable adjustment of other variables, including selection of appropriate solvent, in any desired interval between preparation of the mixture and first precipitation of partially cured product from the solution. However, it is often advantageous to use only a limited number of amines and vary the time between mixing and first separation from solution by using an appropriate amount of a cure rate modifying compound. Since the rate of the curing reaction between polyepoxides and amines in alcoholic solution is usually too high, rate retarding modifiers are required. These include particularly ketones, aldehydes, and aromatic hydrocarbons. Particularly preferred are acetone and cyclohexanone. Aromatic hydrocarbons may be benzene or higher aromatics up to those boiling in the kerosene boiling range, e.g., up to 550° F. Mixtures consisting predominantly of aromatics may be used, e.g., aromatic kerosene extracts of 80% or more aromaticity. For a reaction mixture, in a given alcohol, of a given polyepoxide and a given curing agent the amount of cure retardant can be selected to provide a desired interval between mixing and first separation of partially cured product from solution, as illustrated below by numerical example.

Crude oil displacing fluids

If the formation to be treated is an oil-bearing one, it may be advantageous to first displace crude oil from the formation. This may be done with any hydrocarbon fluid of reasonably low viscosity, e.g., a kerosene, diesel oil, or other middle distillate, which is miscible with the crude oil in the formation.

Water displacing fluids

When consolidating part of an underground formation which contains connate water, i.e., liquid water adhering to the grains of the formation due to capillary forces, it is usually preferred to remove such connate water before injecting resin solution into the formation. Several types of water removing fluids may be employed for flushing connate water from a formation. The water-removing fluid may be an oil solution of a surfactant. A preferred surfactant for this purpose has the formula R—NH—$(CH_2)_3$—$NH_2$, wherein R is an alkyl group derived from coconut oil, soya oil or tallow. A different group of suitable water-removing fluids are ketones having less than 6 C-atoms per molecule, e.g., acetone or methyl ethyl ketone. Preferred, because of their compatibility with the resin solution, are the lower aliphatic alcohols which also serve as the resin solvents.

Spacer fluids

In order to prevent untimely precipitation of epoxy resin, a spacer fluid is employed between the water-displacing fluid and the resin solution when these are incompatible. Suitable spacer fluid is soluble in the resin solution and non-reactive with the ingredients thereof. Suitable spacer fluids are, in general, the same alcohols used as solvents in the resin solution.

Illustrative examples

When treating permeable masses which are located at a distance below the surface, the time required to inject a solution containing the epoxy compound and the curing agent from the top of a well to the formation to be consolidated varies, i.e., with the depth of the formation and with the rate at which solution can be injected into said formation. The period of time during which separation of the intermediate resinous product out of the solution will not take place has therefore to be controllable within wide limits so that, on the one hand, in deep wells no separation of resin will take place before the solution has entered into the formation (which would result in a plugging of the wall of the formation), and on the other hand, when consolidating formations which are at a shallow depth not too much time will be lost before the consolidation begins to take place.

Preferably tests are carried out to determine the percentages of the most suitable epoxy compound, curing agent, solvent and cure rate controlling compound which will give the best results under the prevailing conditions of temperature, pressure, depth, porosity and the like, to which the solution will be exposed.

In the following examples, unless otherwise stated, the epoxy compound is of the type prepared from 2,2-bis(4-hydroxyphenyl)propane and epichlorohydrin as described in U.S. 2,633,458 under the heading "Polyether A"; it has an epoxy value of about 0.54 eq./100 g., an epoxide equivalent of about 185, an average molecular weight of about 380, and a viscosity at 25° C. in the range from 100 to 160 poises.

By way of example, the results of such tests are shown in Table 1. In these tests ethanol is used as an alcoholic solvent in which is dissolved an epoxy compound and a curing agent. The various curing agents are as indicated in Table 1. For improving the solvent power at room temperature and retarding the reaction rate there is added a hydrocarbon mixture boiling between 370° and 510° F. and having a content of aromatic hydrocarbons in excess of 80%. This hydrocarbon mixture is added to the alcoholic solvent in a ratio of one to three volumes. In the final solutions containing ethanol, aromatics, epoxy compound and curing agent, the combined concentration of epoxy compound and curing agent is 18 percent by volume.

For various curing agents there had previously been determined the volume ratio of curing agent to polyepoxide at which optimum compressive strength could be obtained when consolidating sand packs having a mean particle size of 0.2 millimeter, while the combined concentration of epoxy compound and curing agent in the solution was kept constant at 18 vol. For the volume ratios thus found, the initial resin separation time, i.e., the period of time elapsing between the moment of preparation of the solution and the moment at which the first droplets of resin separate from this solution is determined at various temperatures. The results are shown in Table 1.

TABLE 1

| Curing Agent | Volume ratio curing agent/ polyepoxide giving optimum compr. strength | Initial resin separation time (in hours) | | |
| --- | --- | --- | --- | --- |
| | | 40° C. | 60° C. | 80° C. |
| Mixture of bis(4-aminocyclohexyl)methane and 1-cyclohexylamino-3-aminopropane | 0.4 | 2.8 | 1.4 | 0.5 |
| 1-cyclohexylamino-3-aminopropane | 0.3 | -------- | 2.0 | 1.3 |
| Bis(3-methyl-4-aminocyclohexyl)methane | 0.5 | 5.9 | 1.8 | 0.75 |
| Bis(4-aminophenyl)methane | 0.33 | 2.8 | 1.4 | 0.75 |
| Methane diamine | 0.3 | -------- | -------- | 4.0 |
| 1,3-diamino benzene | 0.14 | 3.7 | 1.7 | 0.7 |
| Bis(4-aminophenyl)sulfone | 0.32 | -------- | -------- | >20 |

By using other epoxy compounds, and/or alcohols and/or curing agents and/or cure rate modifiers than those shown in Table 1, other values can be found for the ratio of curing agent to epoxy compound which results in optimum strength, as well as for the initial resin separation time.

As will be clear from Table 1, the initial resin separation time is less at the higher temperatures. Further, as for a certain temperature there will be found various values for the initial resin separation time when using various polyepoxides, curing agents and alcoholic solvents, it will be clear that for each combination of depth and conditions there can be found a combination of polyepoxide curing agent and alcoholic solvent which under the prevailing conditions will give an initial resin separation time which is sufficiently long to ensure the passage of the solution containing the mixture of epoxy compound and curing agent down into the formation without any separation of resin taking place.

Under certain circumstances, however, it might be a drawback to have a fairly large number of curing agents in stock. Then it will be desirable to use only a single curing agent and to control the initial resin separation time by means of a reaction controlling component. A retarder is generally needed in view of the rather short reaction periods occurring when using alcohols as solvents. By way of example, there is shown in Table 2 the range over which the initial resin separation time can be varied when varying the type of alcoholic solvent and the volume percentage of the retarder, in this case acetone, in the solution. In the examples given in Table 2, the solution of which the solvent and the retarder form part further contains 13.5 vol. percent of polyepoxide and 4.5 vol. percent bis(4-aminophenyl)methane as a curing agent.

TABLE 2

| Type of alcoholic solvent | Acetone concentration, vol. percent | Initial resin separation time (in hours) | | |
| --- | --- | --- | --- | --- |
| | | 40° C. | 60° C. | 80° C. |
| Methanol | 0 | 0.6 | 0.28 | 0.1 |
| Do | 10 | 2.0 | 0.77 | 0.35 |
| Do | 15 | 3.2 | 1.1 | 0.47 |
| Do | 20 | -------- | 1.6 | 0.65 |
| Do | 25 | -------- | 2.4 | 0.87 |
| Do | 30 | -------- | 3.3 | 1.2 |
| Ethanol | 10 | 2.5 | 1.2 | 0.5 |
| Do | 15 | 4.5 | 1.8 | 0.75 |
| Do | 20 | -------- | 2.8 | 1.1 |
| Do | 25 | -------- | 3.9 | 1.6 |
| Do | 30 | -------- | -------- | 2.3 |
| Do | 35 | -------- | -------- | 3.4 |
| Isopropyl alcohol | 10 | 4.8 | 2.5 | 1.2 |
| Do | 15 | 8.9 | 3.8 | 2.0 |
| Do | 20 | 21 | 5.7 | 2.5 |
| Do | 25 | -------- | 7.5 | 3.8 |

Further, it has been found that the compressive strength of a permeable mass consolidated according to this invention will be improved when the cured epoxy compound is contacted for some time with a washing fluid suitable for extracting the solvent occluded in the cured epoxy compound. When alcohols were used as solvents, it is preferred to use as the washing fluid a hydrocarbon or a mixture of hydrocarbons, such as gas oil. If the consolidated mass forms part of an oil containing formation and is located around a production well, the crude oil produced from the formation may serve as the washing fluid.

In order to get an indication of the compressive strength of an earth formation after consolidation according to this invention, laboratory tests can be carried out wherein a mass equivalent to the subsurface mass is treated and the compressive strength thereof is determined at the conditions to be expected in the formation. In case that the mass to be treated forms part of an oil producing formation, the test mass in the laboratory is flushed with a hydrocarbon washing fluid before measuring the compressive strength in order to simulate field conditions.

In Table 3 there is shown, by way of demonstration, the influence of the temperature on the compressive strength of a consolidated mass of heath sand. In the tests a mass of heath sand having a mean particle size of 0.2 millimeter was consolidated by a solution comprising the following components:

Curing agent: bis(4 - aminophenyl)
  methane _____ 4.5 vol. percent.
Epoxy compound _____ 13.5 vol. percent.
Solvent:
  In series A _____ Methanol.
  In series B _____ Ethanol.
  In series C _____ Isopropanol.
Retarder _____ Acetone.

The concentration of acetone was chosen such that, in each case, an initial resin separation time of 2½ hours was obtained.

TABLE 3

| Temperature in ° C. | Compressive strength in kilograms per square centimeter | | |
|---|---|---|---|
| | Series A | Series B | Series C |
| 40 | 205 | 182 | 167 |
| 60 | 243 | 224 | 221 |
| 80 | 288 | 260 | 251 |

The compressive strength can be increased by increasing the concentration of the epoxy compound in the solution. As this will be accompanied by an increasing reduction of the permeability, it will be necessary when treating permeable masses through which fluids have to pass, such as formation parts surrounding production wells, to find a compromise between the permeability reduction and the compressive strength.

A preferred method of practicing the present invention in an undergound formation will now be described by way of example.

In an oil well in which the oil-producing formation consists of an unconsolidated sand, the formation conditions such as temperature and injectivity are measured. Samples of the formation sands may be taken for the purpose of measuring, inter alia, the water saturation.

From the pump capacity and the depth as well as the injectivity or permeability of the formation, the minimum required initial resin separation time, which at least equals the time required to pump the resin solution down to the formation, can be calculated.

From laboratory test results such as those in Tables 1 and 2, the required percentages of the epoxy compound, curing agent, retarder, if used, and alcoholic solvent are determined, which give an initial resin separation time which at the temperature of the earth formation is sufficient to permit pumping the solution down into the formation without encountering separation of resin from the solution.

The required proportions of epoxy compound, curing agent and, if present, retarder for decelerating the rate of reaction between curing agent and epoxy compound to the desired degree, are subsequently dissolved in the solvent.

If the formation has such a water saturation the removal of water is necessary before consolidating the formation, a quantity of water-removing fluid is pumped into the formation before pumping down the required quantity of the resin solution, the quantity being calculated to displace water from the volume of the part of the formation to be consolidated. The displacing fluid is preferably the same type of alcohol as resin solvent, in which case no spacer fluid is required.

A drive fluid is used to transport the water-removing fluid and the resin solution down to the well and into the formation.

The water-removing fluid enters the part of the formation to be treated and dissolves the connate water adhering to the grains of the formation. Thereafter, the resin solution enters and displaces the water-removing fluid.

As the resin solution should be kept in the part of the formation to be consolidated until the reaction is completed, the injection of the drive fluid is discontinued as soon as all the resin solution has entered the formation. Care should be taken that the solution or part thereof does not remain in the well, as otherwise an impermeable epoxy resin sheath will be formed on the formation face, which will prevent the passage of fluid out of the formation into the well or vice versa. Further, the solution should not be driven to far into the formation, as otherwise those parts of the formation directly surrounding the well will not be consolidated. A suitable drive fluid is one having plastering properties, such as a mud slush, as such fluid will form a substantially impermeable sheath on the wall of the formation directly after the resin solution has been forced into the formation, whereby any further displacement of the resin solution in the formation will be prevented. Other suitable drive fluids may be used, e.g., crude oil, other hydrocarbon oils, and the like.

As a result of the reaction between the epoxy compound and the curing agent an intermediate resinous reaction product is precipitated from the solution on the surface of the sand grains, which product on further hardening bonds the individual grains together whereby a consolidated mass is obtained. After the consolidation, the solvent left in the pores of the formation is replaced by a washing fluid which is suitable to extract the solvent occluded in the cured resin. If the well is an injection well, there can be used as a washing fluid a hydrocarbon such as a gas oil containing no, or only a small amount of, aromatic compounds. If the well is to be used as a production well, the washing fluid can be constituted by the crude oil present in the formation, by merely bringing the well into production.

The method of this invention is further illustrated by reference to the drawing. In FIG. 1 a well borehole 11 is shown which has been drilled through various strata including a formation or formations having an oil producing zone 12. The well casing 13 is shown as positioned in the borehole. Depending within the well casing 13 is the lower end of a production tubing 14 having mounted at the lower end thereof a well packer 15.

After the required preparations have been made as described, a water displacing fluid, e.g., isopropyl alcohol, is first pumped down through tubing 14 and into the oil bearing formation. Following this there is pumped down into the well the prepared resin solution consisting of an alkanol such as isopropanol, containing dissolved therein an epoxy resin, an amine curing agent, and a cure retarder, all as described above. In order to obtain the desired results said solution is used promptly after it is prepared.

FIG. 1 schematically illustrates a section through the formation while the last part of the resin solution is being pumped down through tubing 14 and into the formation through the lower end of borehole 11. The portion of the oil zone nearest the well borehole has the pores between sand grains of the formation filled with resin solution 16. Immediately outside the zone containing the resin solution there is a zone into which the water displacing liquid 18 has been displaced.

After the remaining resin solution has been pumped into the formation the well is shut in for 24 hours to permit the resin to precipitate from solution and harden on the sand grains of the formation. Thereafter the well is opened, permitting the remaining part of the resin solution and the water displacing liquid to be withdrawn back into the borehole and up through the tubing, either by virtue of the natural pressure of fluids in the formation or by pumping, as required. The zone 16 which had contained the resin solution is now a consolidated sand, firmly held in place by its resin content. Its strength continues to increase for several days after completion of the treatment, and ultimately reaches a plateau of strength which appears to be permanent.

FIG. 2 illustrates a modification of the method of FIG. 1. In this case a borehole containing well casing 13 traverses oil zone 12. Dependent in the casing is a tubing string 14 which is perforated at the lower end thereof with perforations 23 and which carries straddle packers 21 and 22, capable of isolating a section of the borehole within the oil bearing formation 12. Within said isolated section, the casing is perforated with perforations 24, so that the tubing is in liquid communication with the oil bearing formation.

FIG. 2 illustrates the situation after water displacing liquid and resin solution have been pumped down through tubing 14 and into oil zone 12 and the solution drive fluid 25 has just reached the walls of the casing. At this stage further pumping into the formation is discontinued and the well is shut in for a period such as, for example, 36 hours, to permit the resin to precipitate from the solution and harden on the sand grains of the formation.

FIG. 3 illustrates the same well as FIG. 2, after the well has been placed in operation. Water displacing liquid as well as the remaining components of the resin solution have been withdrawn back up through tubing 14 and oil is now being produced from formation 12 and being removed through the tubing. Zone 31 shows the area which had been penetrated by the resin solution. In this area the sand grains which were previously unconsolidated are now firmly bound together by cured resin.

It will be readily apparent that numerous other methods for introducing the required solutions into desired earth formations can be applied. For example, it is sometimes desirable to place a casing string in the borehole, seal the casing string in the borehole along the length of the string passing through the formation to be treated, form a channel through the string and into the permeable section of the formation and then inject the treating solution in the manner previously described through the channel so formed into the permeable formation. Details concerning such a method of injecting treating solutions in general into a formation are given, for example, in copending patent application 169,016 to Prats et al., filed January 26, 1962.

When only a small portion of formation is to be treated, a special tool may be employed in which each solution, i.e., water displacing fluid and treating solution, is contained in a separate compartment. The tool is lowered on a wireline to the desired depth, the casing and formation are penetrated if necessary, the solutions are forced from the tool into the formation in the desired sequence, and the well is shut in for the time required for the resin to precipitate and harden. This system permits use of faster acting curing agents than those in which solutions are pumped into the well. Retarder may be omitted from such solutions.

Still other methods of injecting the desired treating solutions into the formation to be treated will occur to the person skilled in the art.

The following illustrates the application of the method of this invention to consolidation of sand surrounding an oil well. The oil producing formation is a clean, well developed, sand stringer in the Miocene N series. An analysis of side wall samples, which are loosely consolidated very fine to fine grain sand, indicates that the sand contains approximately 10% clay, such as kaolinite and montmorillonite. The interval to be consolidated in the well is a 9 foot stringer of which 6 feet is perforated. The bottom hole temperature is 80° C.

Prior to preparing the resin solution, the initial resin separation times for solutions of 13.5% of polyepoxide and 4.5% of bis(4-aminophenyl)methane in isopropanol with varying amounts of acetone are determined at 80° C. In this instance, the information is presented in Table 2, above. The well crude oil being not completely soluble in diesel oil, a 50–50 blend of diesel oil and aromatic kerosene extract is used as a first wash in the well treatment. This blend dissolves all the components of the crude.

The treatment is designed to consolidate a cylinder 3 feet in radius and 9 feet in depth, the entire thickness of the sand stringer. The sand is first washed with 3 pore volumes of the blend of diesel oil and kerosene extract. This is followed by an equal volume of isopropyl alcohol to remove any remaining water from the formation. The resin solution is mixed to have an initial resin separation time sufficient to permit it to be pumped into the formation. About 1.1 pore volume of the resin solution is placed into the formation. Care is taken that the resin solution is just displaced into the formation without penetrating too far and without retaining any resin solution in the well bore itself. The well is then shut in for 24 hours.

When pressure is released on the well, the fluids begin to unload immediately. Thus swabbing is not required to bring the well into production. On a 1 hour production test only 0.2% B.S. shakeout is obtained. Although similar sand has been effectively retained by other methods not involving epoxy resin solutions, those wells have produced large amounts of sand during cleanup until bridging occurs. This well produces sand free immediately. Sand free production is thereafter obtained.

We claim as our invention:

1. A method for treating a porous earth formation which comprises
   (a) preparing a solution comprising an alcoholic solvent, an epoxy resin having more than one vicinal epoxy group per molecule, an amine curing agent for said epoxy resin,
      the total amount of epoxy resin and curing agent being between 3 and 50 volume percent of said solution, the composition of said solution being predetermined to maintain the reaction product of said resin and amine in solution for the time required to inject said solution into said formation,
   (b) injecting said solution into said formation, and
   (c) retaining said solution in said formation for a sufficient time to permit partially cured epoxy resin to separate from said solution, deposit on the sand grains of said formation, and cure to a hard, crosslinked, hydrocarbon insoluble resin.

2. A method for consolidating an at least substantially unconsolidated porous earth formation consisting predominantly of discrete grains, which comprises
   (a) preparing a solution comprising an alcoholic solvent, an epoxy resin having more than one vicinal epoxy group per molecule, an amine curing agent for said epoxy resin,
      the total amount of epoxy resin and curing agent being between 3 and 50 volume percent of said solution, the composition of said solution being predetermined to maintain the reaction product of said resin and amine in solution for the time required to inject said solution into said formation,
   (b) injecting said solution into said formation, and
   (c) retaining said solution in said formation for a sufficient time to permit partially cured epoxy resin to separate from said solution, deposit on the sand grains of said formation, and cure to a hard, crosslinked, hydrocarbon insoluble resin.

3. A method for consolidating an at least substantially unconsolidated water-wet porous earth formation consisting predominantly of discrete grains, which comprises
   (a) preparing a solution comprising an alkanol of 1 to 4 carbon atoms per molecule, an epoxy resin having more than one vicinal epoxy group per molecule, an amine which is capable of acting as curing agent, for said epoxy resin and of rendering the partially cured epoxy resin surface active and capable of preferentially wetting the sand grains of said formation, the total amount of epoxy resin and curing agent being between 3 and 50 volume percent of said solution, the composition of said solution being predetermined to maintain the reaction product of said resin and amine in solution for the time required to inject said solution into said formation, (b) displacing substantially all unbound water from said formation, (c) thereafter injecting said solution into said formation, and (d) retaining said solution in said formation for a sufficient time to permit partially cured epoxy resin to separate from said solution, deposit on the sand grains of said formation and cure to a hard, cross-linked, hydrocarbon insoluble resin.

4. A method for consolidating an at least substantially unconsolidated water-wet porous earth formation which is penetrated by a borehole, comprising the steps of (a) preparing a solution comprising an alkanol of 1 to 4 carbon atoms per molecule, an epoxy resin having more than one vicinal epoxy group per molecule, an amine which is capable of acting as curing agent for said epoxy resin and of rendering the partially cured epoxy resin surface active and capable of preferentially wetting the sand grains of said formation, the total amount of epoxy resin and curing agent being between 3 and 50 volume percent of said solution, the composition of said solution being predetermined to maintain the reaction product of said resin and amine in solution for the time required to inject said solution into said formation, (b) isolating a zone of said borehole adjacent the formation interval to be treated, (c) displacing substantially all unbound water from said formation, (d) thereafter pumping said solution into said formation through said isolated zone of said borehole, and (e) retaining said solution in said formation for a sufficient time to permit partially cured epoxy resin to separate from said solution, deposit on the sand grains of said formation and cure to a hard, cross-linked, hydrocarbon insoluble resin.

5. A method for treating a water-wet, permeable earth formation which is penetrated by a borehole in fluid communication with said formation, comprising the steps of (a) preparing a solution of resin and amine which maintains a viscosity below 100 centipoises at least until it enters said formation, comprising (1) an alkanol of 1 to 4 carbon atoms per molecule, (2) a normally liquid polyepoxide having more than one vicinal epoxy group per molecule, and (3) an amine which is capable of acting as curing agent for said polyepoxide and of rendering the partially cured epoxy resin surface active and capable of preferentially wetting the sand grains of said formation, the total amount of epoxy resin and curing agent being between 3 and 50 volume percent of said solution, the composition of said solution being predetermined to maintain the reaction product of said resin and amine in solution for the time required to inject said solution into said formation, (b) isolating a zone of said borehole adjacent the formation interval to be treated, (c) pumping into said formation through said isolated zone of said borehole as water displacing fluid an alkanol of 1 to 4 carbon atoms per molecule, (d) thereafter pumping said resin solution into said formation through said isolated zone of said borehole, and (e) retaining said solution in said formation for a sufficient time to permit partially cured epoxy resin to separate from said solution, deposit on said sand grains, and cure to a hard, cross-linked hydrocarbon insoluble resin.

6. A method for consolidating an interval of an at least substantially unconsolidated water wet, permeable earth formation, which interval is in fluid communication with a borehole and with an oil bearing earth formation, comprising the steps of (a) preparing a solution of resin and amine which maintains a viscosity below 100 centipoises at least until it enters said formation, comprising (1) isopropanol (2) a normally liquid polyepoxide having more than one vicinal epoxy group per molecule which is the product of the reaction of 2,2-bis(4-hydroxyphenyl)propane and epichlorohydrin in an alkaline medium, (3) a carbocyclic polyamine having at least one 6-membered carbocyclic ring, which is capable of acting as curing agent for said polyepoxide and of rendering the partially cured epoxy resin surface active and capable of preferentially wetting the sand grains of said formation, and (4) a cure retardant, the total amount of epoxy resin and curing agent being between 3 and 50 volume percent of said solution, and said amine being present in said solution in an amount exceeding by at least 5 mol percent the stoichiometric equivalent of said epoxy resin, (b) isolating a zone of said borehole adjacent the formation interval to be treated, (c) pumping into said formation interval through said isolated zone of said borehole a crude oil displacing fluid, (d) thereafter pumping into said formation interval through said isolated zone of said borehole isopropanol as water displacing fluid, (e) thereafter pumping said resin solution into said formation interval through said isolated zone of said borehole, (f) retaining said solution in said formation for a sufficient time to permit partially cured epoxy resin to separate from said solution, deposit on the sand grains of said formation as a thin surface layer and cure to a hard, cross-linked, hydrocarbon insoluble resin, and (g) producing oil from said oil-bearing formation through said consolidated formation interval and said borehole.

7. The method according to claim 6 wherein said cure retardant is acetone.

8. The method according to claim 6 wherein said cure retardant is an aromatic hydrocarbon.

9. The method according to claim 6 wherein the curing agent is bis(4-aminophenyl)methane.

10. The method according to claim 6 wherein the curing agent is 1,3-diaminobenzene.

11. The method according to claim 6 wherein the curing agent is bis(4-aminophenyl)sulfone.

12. The method according to claim 6 wherein the curing agent is 1-cyclohexylamino-3-aminopropane.

13. The method according to claim 6 wherein the curing agent is bis(4-aminocyclohexyl)methane.

14. The method according to claim 6 wherein the curing agent is bis(3-methyl-4-aminocyclohexyl)methane.

15. The method according to claim 6 wherein the curing agent is a mixture of bis(4-aminocyclohexyl)methane and 1-cyclohexylamino-3-aminopropane.

16. The method according to claim 1 wherein said solution contains a cure retardant.

17. The method according to claim 5 wherein said solution contains a cure retardant.

References Cited by the Examiner

UNITED STATES PATENTS

| 3,100,527 | 8/1963 | Hilton et al. | 166—33 |
| 3,123,138 | 3/1964 | Robichaux | 166—33 |

CHARLES E. O'CONNELL, *Primary Examiner.*

T. A. ZALENSKI, *Assistant Examiner.*